United States Patent
De et al.

(10) Patent No.: US 10,402,771 B1
(45) Date of Patent: Sep. 3, 2019

(54) SYSTEM AND METHOD FOR EVALUATING DRIVERS USING SENSOR DATA FROM MOBILE COMPUTING DEVICES

(71) Applicant: Uber Technologies, Inc., San Francisco, CA (US)

(72) Inventors: Nirveek De, San Bruno, CA (US); Dhruv Tyagi, San Francisco, CA (US); Joseph Sullivan, Palo Alto, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/470,748

(22) Filed: Mar. 27, 2017

(51) Int. Cl.
| | |
|---|---|
| *G01S 5/00* | (2006.01) |
| *G08G 1/00* | (2006.01) |
| *G08G 1/01* | (2006.01) |
| *H04W 4/02* | (2018.01) |
| *G06Q 10/06* | (2012.01) |
| *G08G 1/0967* | (2006.01) |
| *H04W 4/04* | (2009.01) |

(52) U.S. Cl.
CPC ...... *G06Q 10/06398* (2013.01); *G01S 5/0027* (2013.01); *G08G 1/012* (2013.01); *G08G 1/0112* (2013.01); *G08G 1/0967* (2013.01); *G08G 1/20* (2013.01); *H04W 4/027* (2013.01); *H04W 4/046* (2013.01); *G06Q 10/063* (2013.01); *G06Q 10/0639* (2013.01); *G08G 1/0104* (2013.01); *H04W 4/04* (2013.01)

(58) Field of Classification Search
CPC .... G01S 5/0027; G08G 1/0112; G08G 1/012; G08G 1/0967; G08G 1/20; G08G 1/0104; H04W 4/027; H04W 4/046; H04W 4/04; G06Q 10/063; G06Q 10/0639
See application file for complete search history.

(56) References Cited

U.S. PATENT DOCUMENTS

| | | |
|---|---|---|
| 6,195,648 B1 | 2/2001 | Simon |
| 6,263,435 B1 | 7/2001 | Dondeti |
| 8,010,285 B1 | 8/2011 | Denise |
| 8,417,448 B1 | 4/2013 | Denise |
| 8,417,449 B1 | 4/2013 | Denise |
| 8,538,158 B1 | 9/2013 | Denise |
| 8,670,930 B1 | 3/2014 | Denise |

(Continued)

FOREIGN PATENT DOCUMENTS

| | | |
|---|---|---|
| EP | 1156462 | 11/2005 |
| EP | 2767962 | 8/2014 |

(Continued)

OTHER PUBLICATIONS

International Search Report and Written Opinion in PCT/US2016/026799 dated Jul. 28, 2016.

(Continued)

*Primary Examiner* — Hussein Elchanti
(74) *Attorney, Agent, or Firm* — Mahamedi IP Law LLP

(57) ABSTRACT

A network computer system determines a driving ability of a driver using sensor data that is obtained from a mobile computing device of a driver. In some examples, the network computer system determines the driving ability by comparing the sensor data obtained from the mobile computing device of the driver with a set of sensor values that are based at least in part on sensor data obtained from one or more other drivers over a same or similar route.

20 Claims, 5 Drawing Sheets

(56) References Cited

U.S. PATENT DOCUMENTS

| | | | |
|---|---|---|---|
| 8,718,926 B1 | 5/2014 | Denise | |
| 8,915,738 B2 * | 12/2014 | Mannino | G09B 9/052 |
| | | | 434/236 |
| 8,924,240 B2 | 12/2014 | Depura et al. | |
| 8,934,719 B1 | 1/2015 | Denise | |
| 9,097,545 B1 | 8/2015 | Denise | |
| 9,898,759 B2 * | 2/2018 | Khoury | G06Q 30/0266 |
| 2008/0252412 A1 | 10/2008 | Larrson | |
| 2008/0255722 A1 | 10/2008 | McClellan | |
| 2009/0088924 A1 | 4/2009 | Coffee | |
| 2009/0192851 A1 | 7/2009 | Bishop | |
| 2009/0234552 A1 * | 9/2009 | Takeda | B60W 30/16 |
| | | | 701/96 |
| 2010/0020170 A1 * | 1/2010 | Higgins-Luthman | |
| | | | B60Q 1/1423 |
| | | | 348/135 |
| 2010/0136994 A1 | 6/2010 | Kim | |
| 2011/0000747 A1 | 1/2011 | Wu | |
| 2011/0301806 A1 * | 12/2011 | Messier | G01C 21/3469 |
| | | | 701/423 |
| 2011/0301985 A1 | 12/2011 | Camp | |
| 2012/0174111 A1 * | 7/2012 | Pala | G06F 3/011 |
| | | | 718/102 |
| 2012/0191343 A1 * | 7/2012 | Haleem | G01C 21/3697 |
| | | | 701/431 |
| 2012/0232741 A1 * | 9/2012 | Sekiyama | G07C 5/0808 |
| | | | 701/29.1 |
| 2012/0232943 A1 | 9/2012 | Myr | |
| 2012/0283893 A1 | 11/2012 | Lee | |
| 2013/0005414 A1 | 1/2013 | Gurbrinder et al. | |
| 2013/0066688 A1 | 3/2013 | Pinkus | |
| 2013/0226622 A1 * | 8/2013 | Adamson | G06Q 40/08 |
| | | | 705/4 |
| 2013/0311081 A1 * | 11/2013 | Yamakawa | G01C 21/00 |
| | | | 701/428 |
| 2013/0345961 A1 | 12/2013 | Leader | |
| 2014/0051465 A1 | 2/2014 | Ruys | |
| 2014/0067434 A1 | 3/2014 | Bourne et al. | |
| 2014/0129951 A1 | 5/2014 | Amin et al. | |
| 2014/0207342 A1 | 7/2014 | Chen et al. | |
| 2014/0358376 A1 | 12/2014 | Phelan | |
| 2015/0095235 A1 | 4/2015 | Dua | |
| 2015/0100505 A1 | 4/2015 | Binion | |
| 2015/0106900 A1 | 4/2015 | Pinski | |
| 2015/0113622 A1 | 4/2015 | Dua | |
| 2015/0223024 A1 * | 8/2015 | Abuodeh | H04W 4/02 |
| | | | 455/456.3 |
| 2015/0266455 A1 * | 9/2015 | Wilson | G09B 19/10 |
| | | | 701/93 |
| 2015/0279213 A1 | 10/2015 | Balter | |
| 2015/0302342 A1 | 10/2015 | Yeh | |
| 2015/0307107 A1 | 10/2015 | Tamari | |
| 2015/0348221 A1 | 12/2015 | Pedersen | |
| 2016/0358388 A1 | 12/2016 | Skoglund | |
| 2017/0132540 A1 | 5/2017 | Haparnas | |
| 2017/0371608 A1 | 12/2017 | Wasserman | |
| 2017/0372534 A1 | 12/2017 | Steketee | |
| 2018/0086347 A1 * | 3/2018 | Shaikh | B60W 40/09 |
| 2018/0089605 A1 * | 3/2018 | Poornachandran | |
| | | | G06Q 30/0282 |

FOREIGN PATENT DOCUMENTS

| | | |
|---|---|---|
| EP | 2700063 | 6/2015 |
| JP | 2014-130552 | 6/2014 |
| KR | 10-2014-0124137 | 10/2014 |
| WO | WO2012080741 A1 | 6/2012 |

OTHER PUBLICATIONS

International Search report in PCT/US2016/016858 dated May 19, 2016.
IPRP in PCT/2016/016858 dated Aug. 17, 2017.
International Search Report and Written Opinion in PCT/US2017/037421 dated Aug. 31, 2017.
IPRP in PCT/US2016/026799 dated Oct. 17, 2017.
Written Opinion issued in SG 11201708199T dated May 7, 2018.

* cited by examiner

SYSTEM AND METHOD FOR EVALUATING DRIVERS USING SENSOR DATA FROM MOBILE COMPUTING DEVICES

BACKGROUND

There is an increasing need for drivers on roadways, for commuting, and for providing transport related services. With greater number of drivers, and particularly drivers who are service providers for transport services, there is an increased need for drivers to have better driving ability.

DETAILED DESCRIPTION

Figure 1A:
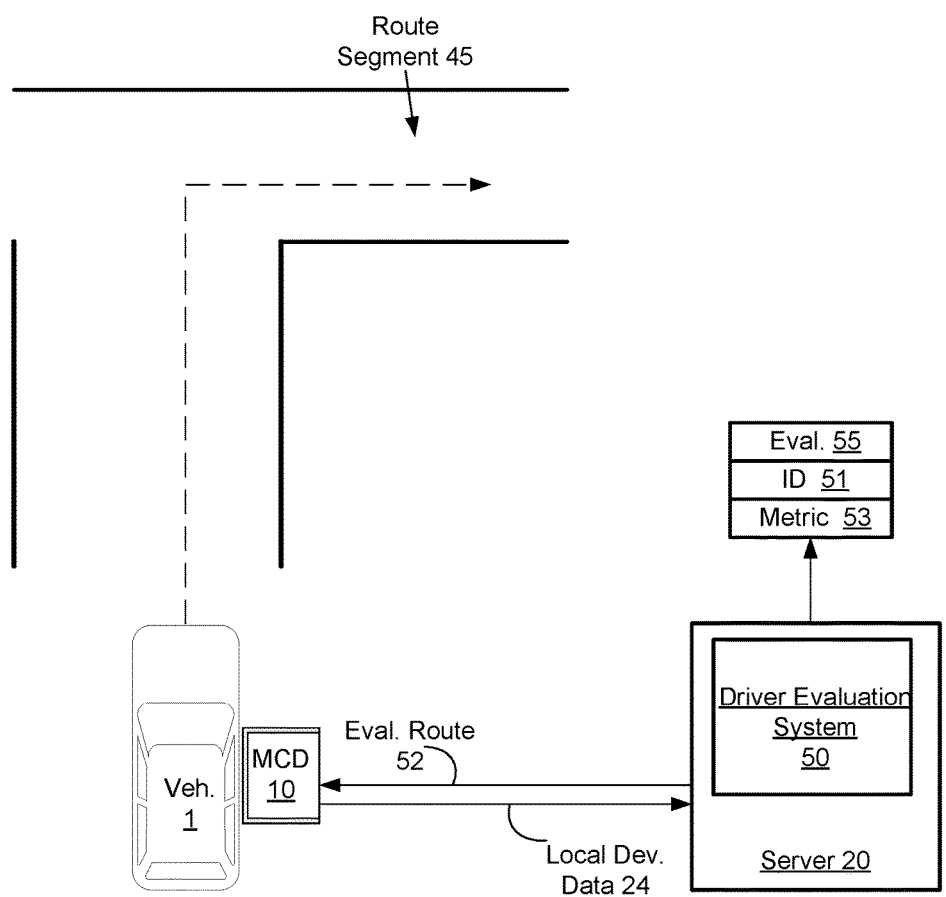
FIG. 1A illustrates an example of a driver evaluation system for remotely evaluating a driver of a vehicle that is on a trip, according to one or more embodiments.

Networked systems can provide a number of services, such as coordinating services between service providers and service requestors. For instance, a particular networked system coordinates transportation between drivers and riders, each carrying their own smartphone or like mobile computing device. In such a case, verifying that the skill of the driver is sufficient to provide a safe and comfortable ride for the rider can improve the benefit of the networked system. According to examples, a network computer system determines a driving ability of a driver using sensor data that is obtained from a mobile computing device of a driver. In some examples, the network computer system determines the driving ability by comparing the sensor data obtained from the mobile computing device of the driver with a set of sensor values that are based at least in part on sensor data obtained from one or more other drivers over a same or similar route. As will be described in greater detail below, there are a number of features that protect the driver's privacy. For instance, example embodiments notify of and request approval for the collection of sensor data for evaluating driving ability. Furthermore, the system filters and processes the collected sensor in a way that protects the privacy of the driver.

Still further, some examples include a network computer system and/or service which operates to remotely detect and characterize driving actions and driving ability of drivers using telematics data from mobile computing devices carried within the respective vehicles. Among other technical benefits, examples enable a network computer system to determine a characterization of a driving maneuver or driving action (e.g., braking action, acceleration, deceleration, turns, etc.) performed by multiple drivers, and to also develop a model (also referred to as a "baseline") based on an aggregation of the characterizations. The maneuvers can be performed on a road segment of a given region. The road segment may or may not be pre-specified. The developed model of driving behavior can be used to devise a route that involves driving maneuvers across a predefined route. The network computer system 100 may instruct drivers to drive on the predefined route. As the drivers progress on the route, the mobile computing devices of the respective drivers communicate telemetry data, from which the network computer system may determine the driving ability of the driver.

In some examples, the network computer system operates to provide feedback or insight into the driving habits of the driver using the obtained telemetric data. In variations, the network computer system may perform additional actions, such as requesting drivers to take further trips until their driving is of an acceptable level. In other variations, the network computer system may operate in connection with a transport arrangement system, which uses the evaluation of the driver's ability as a parameter for matching drivers with service requests and/or service rates.

In some implementations, a network computer system receives, over one or more networks, mobile device data from a given driver who is instructed to traverse a road segment of a geographic region with a vehicle. The mobile device data for the given driver may be indicative of attributes of that vehicle's motion while the vehicle is traversing the road segment. The network computer system 100 can use the mobile device data to determine the driving ability of the driver. For instance, the mobile device data of that vehicle can be used to determine a characterization of at least one driving maneuver performed by the driver while their vehicle is progressing along the road segment and/or performing other actions with their vehicle (such as the driver looking over their shoulder, checking mirrors, waiting for traffic to pass, etc.). The characterizations of the driving maneuvers are aggregated with all or a portion of the population of drivers, and a baseline of the characterization is determined and/or generated for the driving maneuvers based at least in part on the aggregated characterizations.

In some examples, a mobile computing device is operated by a user of a transport arrangement system, such as a driver acting as a service provider. In specific examples, a mobile computing device executes a service application, or is otherwise programmatically equipped to open and maintain a communication channel with a transport related service that is provided over the Internet.

By way of example, mobile computing devices, in context of client devices, can include cellular-capable devices, such as smartphones, feature phones, suitably capable laptops, notebooks, tablets (or hybrid devices or "phablets"), and/or other multi-functional computing devices capable of telephony/messaging. As another example, mobile computing devices can include portable devices (e.g., wearable devices, such as a smart watch) which can directly or indirectly (e.g., via a local wireline or wireless communication (e.g., Bluetooth) that serves as a proxy) communicate with network computer systems over one or more networks. In variations, a mobile computing device can include a roaming device, which is a device that can use a wireless link(s) (e.g., wireless connection implemented through a medium that uses a Bluetooth or 802.11 protocol; infrared; RF channel; Near-Field Communication ("NFC"), etc.) to access a network service over, for example, the Internet. By way of example, such devices can include tablet devices or wearable electronic devices which sometimes link with another device that can operate as a proxy.

While numerous examples provide for a driver to operate a mobile computing device as a client device, variations provide for at least some requesters or passengers to utilize and/or operate a vehicle communication device as the client device. A vehicle communication device can be implemented using, for example, custom hardware, in-vehicle devices, and/or suitable equipped devices that provide alternative On-Board Diagnostic ("OBD") functionality.

One or more embodiments described provide that methods, techniques, and/or actions performed by a computing device are performed programmatically, or as a computer-implemented method. Programmatically, as used throughout, means through the use of code or computer-executable instructions. These instructions can be stored in one or more memory resources of the computing device. A programmatically performed step may or may not be automatic.

One or more embodiments described can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, and network enabled devices (e.g., mobile computing devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1A illustrates an example of a driver evaluation system for remotely evaluating a driver of a vehicle that is on a trip, according to one or more embodiments. As shown by an example of FIG. 1A, a driver evaluation system 50 can be implemented on a server 20, combination of servers, or other network computer system, to communicate with a mobile computing device 10 that is carried within the vehicle 1 (e.g., mobile computing device of the driver). The driver evaluation system 50 and the mobile computing device 10 are coupled over one or more communication channels (not shown). For example, the driver evaluation system 50 can transmit to the mobile computing device 10 data indicative of an evaluation route 52, and the mobile computing device 10 can transmit to the driver evaluation system 50 local device data 24. As described in greater detail below, the driver evaluation system 50 may use the information provided from the mobile computing device 10 to evaluate a driving ability of the driver, when the driver operates the vehicle on an evaluation route 52 that is selected by the driver evaluation system 50. While the vehicle monitoring system 50 is shown in FIG. 1 as being implemented on a server 20 (or combination of servers), it will be appreciated that a number of components and/or functions as described with the driver evaluation system 50 may be deployed in alternative computing environments. For example, the driver evaluation system 50 can be implemented as a computer program stored on computer memory coupled to a processor within the server(s) 20, the mobile device 10, or both server and mobile device 10.

As described with various examples, the driver evaluation system 50 communicates the evaluation route 52 to the mobile computing device 10, to enable the driver to utilize the mobile computing device 10 to maneuver the vehicle 1 along the evaluation route 52. When the vehicle 1 is being driven on the evaluation route 52, the mobile computing device 10 obtains data generated from one or more sensors of the mobile computing device 10 ("local device data 24"). The mobile computing device 10 may transmit the local device data 24 to the driver evaluation system 50 while the vehicle is being driver through the evaluation route 52 and/or after the driver completes the evaluation route. The driver evaluation system 50 may process the local device data 24 in order to determine an evaluation 55 for the driver.

According to some examples, the evaluation route 52 may be selected by the driver evaluation system 50 based on a current or relevant location of the driver, contextual information about a time or location when the evaluation takes place (e.g., visibility, weather conditions), and/or a type of evaluation needed (e.g., based on information known about the driver). In some examples, the evaluation route 52 can be communicated to the driver just before the evaluation is to start. In other variations, the evaluation route 52 can be communicated as segments 45 determined while the driver is operating the vehicle 1 on the evaluation route. Still further, the evaluation route 52 can be communicated in advance, or by identification segments 45 (e.g., turn-by-turn) as the driver progresses through the evaluation route 52. Still further yet, in example embodiments, the driver evaluation system 50 does not provide the mobile computing device 10 the evaluation route 52. Instead, during operation (e.g., "normal" operation), the mobile computing device 10 or the driver evaluation system 50 determines whether the driver has performed one of the one or more predetermined test maneuvers such as certain types of maneuvers (e.g., a left turn, a complete stop) or travel along a certain road segment. In response to detection of a test maneuver being performed, the driver evaluation system 50 evaluates the performance of the test maneuver and records the results. In some example embodiments, the driver evaluation system can keep a data record of which of the predetermined test maneuvers for a driver have been evaluated and which need to be refreshed with new evaluations.

The driver evaluation system 50 stores a number of records, such as driver identifier 51, one or more metrics 53, and evaluation 55. By way of example, the evaluation 55 may associate the driver identifier 51 with one or more metrics 53 that correlate to ability. By way of examples, the metrics 53 may correlate to one or more of an overall skill level of the driver, a skill level of the driver with respect to a particular type of driving (e.g., luxury class driving), and/or a skill level of the driver with respect to a specific category or set of categories (e.g., safety). In variations, the evaluation 55 may also identify strengths and/or weaknesses of the driver, the skill level of the driver with respect to specific maneuvers (e.g., sharp turns), and/or a tendency of the driver to perform a particular driving action that is unwanted. Depending on implementation, the evaluation 55 can be stored by driver evaluation system 50 for later use, and/or communicated back to the driver in order to facilitate the driver to improve his or her driving ability. In variations, the evaluation 55 is used to update a driver's profile with a transportation related service (as described with an example of FIG. 2) or other third-party which may require or otherwise benefit from the driver's evaluation.

Figure 1B:
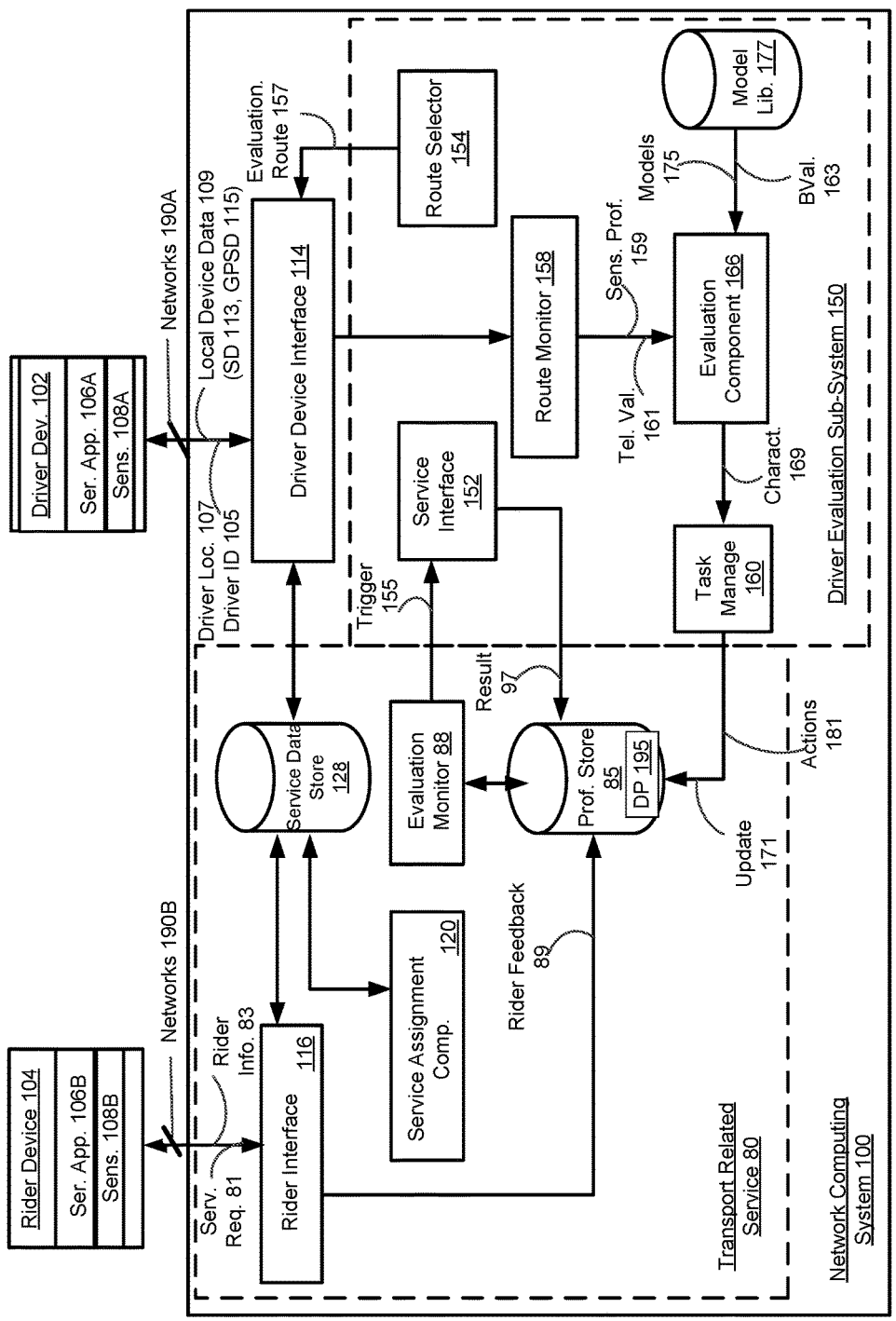
FIG. 1B illustrates an example network computing system, in accordance with examples described herein, to analyze the driving ability of drivers using data generated from mobile device sensors.

FIG. 1B illustrates an example network computing system, in accordance with examples described herein, to analyze the driving ability of drivers using data generated from mobile device sensors. As illustrated in FIG. 1B, a network computing system 100 can operate to receive sensor and position data (e.g., accelerometer data, gyroscope data, GPS data, collectively "local device data 109") transmitted from mobile computing devices disposed within vehicles that are in motion and/or traversing respective portions of a road segment of a given geographic region. The network computing system 100 can use the local device data 109, transmitted from mobile computing devices 102 carried in vehicles, to evaluate and determine the driving ability of those drivers.

In some implementations, the network computing system 100 operates as part of a network service, such as a transportation arrangement service in which vehicles are used to provide on-demand transportation services for transporting people, food and package delivery services, and/or trucking services. Alternatively, the network computing system 100 can operate as an independent service that communicates with individual vehicles of the geographic region.

In some embodiments, the network computing system 100 can communicate with the mobile computing device of a driver or other person within a vehicle to receive local device data 109, including sensor data 113 (e.g., from accelerometer, gyroscope, IMU, etc.) and GPS data 115. In such embodiments, the network computing system 100 and the devices 102, 104 connect to networks to facilitate communications with mobile devices of users (e.g., riders and drivers) who provide or receive transport services. The networks 190a, 190b can include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the networks 190a, 190b include multiprotocol label switching (MPLS), transmission control/protocol/Internet protocol (TCP/IP), hypertext transport protocol (HTTP), simple mail transfer protocol (SMTP), and file transfer protocol (FTP). Data exchanged over the networks 190a, 190b are represented using any format, such as, but not limited to, hypertext markup language (HTML) or extensible markup language (XML). In some embodiments, all or some of the communication links of the networks 212a, 212b are encrypted.

In some embodiments, the network computing system 100 may determine an ability of the driver with respect to one or more categories, such as safe driving, braking habit, steering habit and/or acceleration habit. As described in greater, the network computing system 100 may determine a quantitative metric to represent the driver's level of ability with respect to the one or more driving categories. In determining the quantitative metric(s) for an individual driver, the network computing system 100 can implement processes to compare individual drivers with other drivers using the local device data 109. Still further, in some examples, the network computing system 100 uses the local device data 109 of a given driver driving a given route to compare the driving maneuvers with those of other drivers who drove over the same or comparable route.

In other variations, the quantitative metrics are based on comparisons made between the driver and modeled representations of other drivers (e.g., models of "qualified" drivers or "unqualified" drivers with respect to a predetermined driving evaluation criterion). Modeled representations of other drivers may be developed from monitoring the driving maneuvers of individual drivers who are samples of a given model. For example, for a given geographic region, local device data 109 may be obtained from some drivers who are known or subsequently labeled to be qualified drivers, and a model of a qualified driver may be developed from the local device data 109 transmitted from those drivers.

The network computing system 100 may determine the driving ability of a given driver (e.g., as a score, ranking or other quantitative metric) and then select one or more actions to perform based on the determined driving ability. In some implementations, the network computing system 100 may generate an output (e.g., message) that approves a driver for a specific position (e.g., service provider for a given geographic region) or ranking (e.g., driver is skilled or unskilled, needs/does not need training, etc.). In other examples, the driver may be provided an evaluation with a set of recommendations or observations regarding noteworthy driving tendencies of that driver.

In some examples, the network computing system 100 is implemented to monitor vehicles used with transport-related services, in order to detect driver ability, and to initiate actions to improve the safety of users, which can include drivers, requesters, passengers, and/or people associated with other nearby vehicles on the road. Examples of transport-related services include on-demand transportation services for transporting people, food and package delivery services, and/or trucking services. In monitoring the vehicles, the network computing system 100 may classify or otherwise determine an ability of the driver (e.g., a safety ability, skill ability, driving quality, etc.). Additionally, the network computing system 100 may initiate and/or plan preventative or remedial actions to facilitate those persons associated with the vehicle.

Some examples provide that the network computing system 100 determines a level of driver ability that is accurate, objective, and determined remotely, without input or distraction from the driver. Additionally, some examples initiate and implement actions directed to improving the driving ability of individual drivers. In some examples, the network computing system 100 communicates a result of the driver's evaluation, where the communication identifies a driving tendency of the driver which may be deemed unsafe or undesirable. Additionally, in some examples, the network computing system 100 may provide instructions or guidance for the driver to remediate the unwanted tendency. Still further, the network computing system 100 may identify additional routes for the driver to take in order to enable the driver to practice, as well as to further evaluate whether the driver has made improvement.

The network computing system 100 may, for example, make driver ability determinations automatically, using the mobile computing device (e.g., the driver device 102) that is carried into the driver's vehicle. In this way, the network computing system 100 can evaluate the driver based on the actual road network the driver utilizes in providing services through the transport related service 80. The network computing system 100 can also provide an accurate measure of driver ability since, for example, driving records can be incomplete, unavailable or subject to forgery. Additionally, in many areas, once a driver obtains a license, the driver is deemed a qualified driver, even though the driving ability of the driver may deteriorate. Moreover, a driving ability that is more suitable for transport-related services may differ from those of casual drivers or commutes. As described in greater detail below, the network computing system 100 can generate a driving profile 95 for individual drivers who operate as providers for the transport related service 80. For each driver, the driver profile 95 includes results of one or more prior instances when the driver was evaluated by the network computing system 100, with profile information that is specific to categories of evaluation and driving tendencies of the driver which are unwanted, or otherwise relevant to the services the driver may provide through the transport related service 80. The driving profile 95 of the individual drivers can be updated over time, and also made specific to conditions (e.g., precipitation on road, darkness) which the driver may encounter when providing the transport services.

In some variations, the network computing system 100 also generates local device data 109 that can be evaluated against feedback received from passengers of a driver's feedback. The pairing of feedback with, for example, sensor data relating to acceleration and movement of the vehicle can further tune models for specific types of driving (e.g., driving for comfort of passengers), and enable drivers to be evaluated as to their ability to conform to a specific driving style.

According to an example of FIG. 1B, the network computing system 100 can be implemented as part of another network service (e.g., as part of a transport related service or package delivery service). Alternatively, the network computing system 100 can operate as an independent service that communicates with individual vehicles of a geographic region. The network computing system 100 can operate to receive local device data 109 (e.g., telemetry data, position data) transmitted from vehicles that are in motion and traversing respective portions of a road segment in order to evaluate driving ability with respect to specific driving categories or maneuvers.

The network computing system 100 may communicate with a mobile computing device that is associated with a driver that is being evaluated ("driver device 102"). When the drivers are providing a transport-related service, the driver devices 102 can obtain and transmit local device data 109 to the network computing system 100 to enable the individual drivers to be evaluated. Drivers can be remotely tracked using their own mobile computing devices for driver performance over a given geographic region or over a given road segment. As the vehicle traverses a road segment, the driver device 102 communicates data which enables tracking and evaluation of the driver. The driver device 102 can include one or more motion sensing components, as well as a global positioning system ("GPS") component or resource. By way of example, the driver device 102 can include motion sensing components that include a 3-axis accelerometer, a gyroscope, an inertial measurement unit ("IMU" typically implemented using an accelerometer and gyroscope), a barometer, a microphone, and/or a camera.

In some implementations, the driver device 102 executes a service application 106A, which enables the driver to communicate with the network computing system 100 and to receive services (e.g., trip assignments) through the network computing system 100. The driver service application 106A may correspond to a program (e.g., a set of instructions or code) that is downloaded and stored on the mobile device from, for example, the network computing system 100 and/or an "app" store.

In some embodiments, the driver service application 106A executes on the driver device 102 to sample for telemetry data from sensors (e.g., accelerometer, gyroscope) and position determination components (e.g., GPS) of the driver device 102. In the context of a transport-arrangement service, a driver (or other user) can launch and operate the driver service application 106A on the driver device 102, to communicate availability of the driver to receive assignments, and to communicate a location of the driver at a given moment. When the driver service application 106A is launched, the driver device 102 may be triggered to establish a secure communication channel with the network computing system 100, and further to transmit a driver identifier 105 and current location 107 to the network computing system 100. In some examples, the driver service application 106A also obtains telemetry data from the sensors 108A of the driver device 102, along with position data (including the current location 107) from a GPS or position determination component. The driver service application 106A triggers the driver device 102 to transmit the telemetry and position data to the network computing system 100 as local device data 109, using, for example, a wireless network interface (e.g., cellular network).

In some variations, the local device data 109 can include alternative sensor information captured on the driver device 102, including, for example, image data, audio data, and/or environmental sensor data. This type of information can be used to validate the driver on a given route (e.g., to ensure the driver is the person who is supposed to be in the vehicle), and to evaluate the driver on, for example, alertness (e.g., use camera to capture eye and head movement of driver) and an ability to maintain comfort in the passenger cabin (e.g., temperature sensor). By way of examples, the microphone can provide audio data detecting the use of a turn signal, the audible of a horn (or other audio sound) from another vehicle, and/or a minor collision event. The camera can provide video data of the driver initiating a turn signal or conducting a visual search before changing lanes, backing up, turning at an intersection, etc.

In some examples, the network computing system 100 includes a driver device interface 114, a transport arrangement service 80, and a driver evaluation sub-system 150. The driver device interface 114 exchanges communications with the driver service application 106A, executing on the driver device 102, over a network connection 190A (e.g., such as formed over a cellular network and/or the Internet) to receive the driver identifier 105, the current location 107, and local device data 109. The driver device interface 114 can include, or use, an application programing interface (API), such as an externally facing API, in order to communicate data with the driver device 102. The externally facing API can provide access to the driver device 102 via secure access channels over the network through any number of methods, such as web-based forms, programmatic access via RESTful APIs, Simple Object Access Protocol (SOAP), remote procedure call (RPC), scripting access, etc.

In example embodiments, the driver service application 106A controls data that the driver service application 106A has access to in several ways. For example, the driver interface 114 and the service application 106A transfer data in accordance with permission settings controlled by the user that indicates limitations on the types of sensor data that can collected and when sensor data can be collected. For instance, the user can completely shut off data collection by the driver service application 106A. While example embodiments are described herein in the context of the driver service application 106A as controlling access to sensor data and controlling transmission of sensor data to the driver interface 114, it will be appreciated that these functions can be performed, wholly or in part, by any suitable component of driver device 102 or network computing system 100.

Additionally or alternatively, the driver service application 106A controls data collection with respect to predetermined events that trigger data collection and analysis. For instance, the driver service application 106A monitors sensor data from the driver device 102 to determine whether the vehicle performed a maneuver matching a predetermined event, such as acceleration from a stop, deceleration to a stop, a right turn, a left turn, running in idle for a duration of time, and/or the like. The driver service application 106A can detect events by processing the sensor data (e.g., accelerometer and/or gyroscope sensor data) based on a predetermined event profile. In response to detecting that an event occurred, the driver service application 106 can provide the driver interface 114 sensor data that corresponds to particular types of sensor data for a duration corresponding to the event. For example, in response to detecting idling, the driver service application 106A provides the driver interface 114 sensor data corresponding to at least accelerometer and microphone sensor data captured during the idle event. In another example, in response to detecting turning, the driver service application 106A provides the driver interface 114 sensor data corresponding to at least accelerometer, gyroscope, and microphone sensor data captured during the turn. In yet another example, in response to detecting acceleration/deceleration, the driver service application 106A provides the driver interface 114 sensor data corresponding to at least accelerometer, gyroscope, and microphone sensor data captured during the acceleration/deceleration.

The transport related service 80 may include a requester device interface 116, an assignment component 120, and a service data store 128. The service data store 128 can store the identifier 105 of each driver that is online, the current (or recent) location 107 of the driver, and an assignment state of each driver (e.g., driver available for assignment, driver en route to an assignment, driver on-trip). A requester can launch and operate a rider service application 106B on a requester device 104. From the perspective of a user, the rider service application 106B can enable the requester to view service operations, and to make a service request 81 that specifies a service location (e.g., pickup location, drop-off location). The rider service application 106B can also provide requester information 83 (e.g., a requester identifier and/or state information) and/or requester credentials, along with the transport request 81, to the network computing system 100 when the rider service application 106B is launched.

The transport related service 80 may include a requester device interface 116, a service assignment component 120, and a service data store 128. The network computing system 100, through the transport related service 80, can use requestor device interface 116 to receive the service request 81. The service assignment component 120 can select a particular service provider for the service request 81 using information obtained from the service data store 128. For example, the service assignment component 120 can select a driver by identifying available drivers within a range of the service location specified with the service request 81. When the driver assignment is made for the service request 81, the assignment component 120 updates a state of the driver, and communicates the service location(s) (e.g., pickup location) to the driver. The driver location 107 may be updated via the driver device interface 114 as the driver progresses towards the service location. When the requester is provided service (e.g., requester enters the vehicle), the state of the driver can change in the service data store 128, to show the driver is on-trip.

In some implementations, the requester device interface 116 can include or use an API, such as an externally requester-facing API, to communicate data with requester device 104. The externally facing API can provide access to the requester device 104 via secure access channels over the network 190a through any number of methods, such as web-based forms, programmatic access via RESTful APIs, SOAP, RPC, scripting access, etc.

According to some examples, the requester can provide feedback as to the driving ability of the driver, either during or after the trip. The feedback 89 (e.g., rating) can be stored and/or aggregated with other feedback provided for the driver. In some examples, the transport related service 80 includes a driver profile store 85, which maintains profiles for individual drivers. The requester feedback 89 for a particular trip can be aggregated and stored as part of a driver profile 95, within the driver profile store 85.

The driver evaluation sub-system 150 may implement an evaluation process for a given driver based on the occurrence of certain events or conditions. In some implementations, the driver evaluation sub-system 150 may retrieve or receive driver profile information 95 from the driver profile store 85. In some implementations, the evaluation monitor 88 may check the profile store 85 for new drivers, and then trigger 155 a driver evaluation process from the evaluation sub-system 150 when the driver is deemed to be new. A service interface 152 can initiate the evaluation process when the trigger 155 is received (i.e., when the driver profile information indicates a driver is new). The service interface 152 may initiate the driver evaluation process prior to the driver being accepted as a service provider of the transport related service 80. In some variations, the driver may be accepted on a temporary or conditional basis until satisfactory completion of the driver evaluation process. The service interface 152 may then update the driver profile store 85 with a result 97 (e.g., completion and score) of the driver evaluation process. In such examples, the evaluation monitor 88 can implement the rules by which the on-boarding or acceptance of new drivers is implemented, in connection with the driver's completion of the evaluation process, as provided by the driver evaluation sub-system 150.

In another implementation, the evaluation monitor 88 can scan the service data store 128 and/or driver profile store 85 for pre-determined conditions which are deemed to trigger a driver evaluation. For example, the evaluation monitor 88 can detect active drivers from the service data store 128, and then cross-reference the active drivers with the driver profile store 85 in order to identify those drivers whom are new, those drivers who have not been previously evaluated, and/or those drivers who have not been evaluated in a given duration. In variations, the evaluation monitor 88 can identify, for evaluation, those drivers who recently received poor rating feedback, or feedback that is indicative of the driver having made a driving mistake or having driven poorly. For example, the driver profile store 85 can maintain individual driver profiles 95 which include a history of rating feedback the driver received from requesters, both individually and in aggregate form. The evaluation monitor 88 can implement rules and/or other logic to trigger 155 the driver evaluation sub-system 150 to implement an evaluation process for a given driver when, for example, an aggregate of the driver's ratings is below a threshold, or when a low rating is received that is specific to the ability of the driver.

According to an example, the driver evaluation subsystem 150 includes a route selector 154, a route monitor 158 and an evaluation component 166. In response to the trigger 155, the service interface 152 can initiate the route selector 154 to select an evaluation route 157 for the driver. The selection of the evaluation route 157 can be based on parameters such as a current or home location of the driver (e.g., as determined from the service data store 128 and/or the driver profile 95, stored in the profile store 85), a type of evaluation needed, and/or a time of day or road condition. The selection of the evaluation route 157 may also be based on information provided with the driver profile 95, such as the relative experience or age of the driver, the most recent ratings the driver received, and/or an aggregation of the driver's ratings. In one implementation, the selected evaluation route 157 is selected from a collection of stored routes. As an alternative or variation, the evaluation route 157 may be determined, in whole or in part, on-the-fly using a map service.

In some implementations, the evaluation route 157 is communicated to the driver device 102 via the driver device interface 114 at just before when the evaluation process is to start. For example, the driver may be directed to a starting location of the selected route 157, and as the driver approaches the starting point, some or all of the selected route 157 is communicated to the driver. As another example, the selected route 157 may be communicated to the driver on a turn-by-turn basis. Still further, in some examples, the selected route 157 can be determined on-the-fly, based on, for example, a set of requisite maneuvers the driver is to perform (e.g., pass through 3 stop signs, 3 traffic lights, a threshold number of sharp turns, etc.).

Once the driver begins to drive the vehicle on the selected route 157, the route monitor 158 receives the local device data 109 from the driver device interface 114. The local device data 109 may include the driver location 107, as the driver progresses through the evaluation route 157. The route monitor 158 may process and interpret the local device data 109, to identify sensor values that represent a maneuver or action of the driver. The route monitor 158 may represent the driving actions of the user quantitatively (e.g., as a score or other value). The route monitor 158 may also synchronize the determined values with respect to position. In some implementations, the route monitor 158 develops sensor profiles 159 for specific sets of sensor data, or combinations thereof, showing the sensor values mapped over a distance and/or time. In determining the sensor profiles 159, the route monitor 158 may process the sensor values to determine, for the vehicle and at specific locations, telemetry values 161 representing one or more of a velocity, forward acceleration, reverse acceleration, lateral acceleration, change in elevation, vibration and/or other information. The sensor profiles 159 may plot the telemetry values 161 by position and/or time. As an addition or variation, the sensor profiles 159 can include a feature matrix or other numeric representation which identifies, for example, memorable events reflected by the telemetry values 161. The memorable events may include, for example, peaks and troughs of the respective telemetry values 161, average and median values over a length of multiple points, and/or points on the route where the telemetry values 161 exceeded a threshold.

In some examples, the evaluation component 166 may receive sensor profiles 159 from the route monitor 158, and then compare the sensor profiles 159 to one or more models 175 in order to determine a characterization 169 (or set of characterizations 169) for the ability of the driver. The characterizations 169 can be specific to a particular driving maneuver or action, a particular road segment of the selected route 157, or an aggregate for the selected route or segment thereof. Thus, some examples provide that the evaluation component 166 determines multiple characterizations 169 for the driver, encompassing an overall driving ability of the driver and/or specific driving maneuvers. The characterizations 169 may also be specific to a road type of condition (e.g., windy road, precipitation on road).

In some implementations, the comparison performed by the evaluation component 166 can identify a model 175 that is a best fit or match to the sensor profile (e.g., acceleration or other telemetry value 161 by position). The model 175 may be selected from a library 177 of models, and labeled for parameters that define one or more possible characterizations, such as by skill level (e.g., proficient, not-proficient) and driving maneuver (e.g., sharp turn or braking). The selection of the model 175 may be based on, for example, the closeness of the match (e.g., as determined by distance measurement).

In variations, the evaluation component 166 can compare the sensor profiles 159 (or telemetry values 161) to baseline values 163 that are determined from other drivers. In variations, the baseline values 163 can be composite values that are determined from aggregating the same type of sensor profiles (and telemetry data) from multiple drivers that represent a baseline or reference (e.g., ideal driver). The comparison with baseline values 163 can include a quantitative and/or statistical comparison. For example, in some implementations, telemetry values 161 for the driver may be subtracted or otherwise compared to a reference set of values. As an addition or alternative, the telemetry values 161 and/or difference with the reference values can be processed in accordance with a statistical distribution. For example, the characterizations 169 can reflect instances when the driver went outside of a threshold statistical distribution.

In performing the comparison, the evaluation component 166 can identify one or more models 175 or baseline values 163 which are based on telemetry and sensor profiles of other drivers driving on the same evaluation route 157. In variations, the models 175 or baseline values 163 can be determined drivers driving on a similar route or road segments.

Depending on implementation, the characterizations 169 of the evaluation component 166 can be binary (e.g., pass or fail), trinary (e.g., pass, neutral, fail), and/or a score (e.g., 1 to 10). Furthermore, the characterizations 169 may relate to any one of multiple possible driving maneuvers or road segments, as well as the totality of the selected route 157 and/or overall driving performance. For example, the characterizations 169 can quantify the driver in how he handles sharp turns, traffic signals, stop signs, intersections, road hazards, and other driving conditions. As an alternative or addition, the characterizations can relate to a skill level of the driver as a whole, or with reference to a particular maneuver, or type of road segment.

In some examples, the characterizations 169 may be used to update 171 the driver profile 95 as provided in the driver profile store 85. For example, the characterizations 169 may update 171 the driver profile 95 to identify an ability or skill level of the driver, as well as a propensity of the driver for performing maneuvers in a particular manner. For example, the driving profile 95 may be developed to identify (e.g., as attributes) when the driver has a propensity for sudden forward accelerations, harsh stops, unnecessarily sharp turns, neglect in checking for traffic while changing lanes, as well as other driving habits. In some examples, the characterizations 169 may also identify a severity level of a driving attribute (e.g., the attribute relates to a driving characteristic that correlates with minor risk, major risk, or habitually unsafe drivers, as well as other attributes).

In some examples, the route selector 154 communicates with a map service to determine the evaluation route 157 on-the-fly. In such examples, the route selector 154 can include rules or other logic to stitch the evaluation route 157 together based on a set of route requirements. In this way, the route selector 154 can stitch the evaluation route 157 using roadway segments which are, for example, near the current location of the driver. Still further, the route selector 154 can select road segments for the evaluation route 157 to accurately reflect specific driving maneuvers and/or roadway conditions which, for example, the driver profile 95 indicates are a weakness of the driver.

In some variations, the route selector 154 can select roadway segments for the evaluation route 157 based on predetermined requirements. For example, the route selector 154 can select the evaluation route 157 to include specific attributes, such as a minimum number left and/or right turn, passage through an intersection, a traffic stopping point, a roadway incline or decline (e.g., 4% incline/declines), roadway bends, parallel parking, and/or other driving maneuvers. The evaluation route 157 can be specified to enable the sensor profiles 159 and/or telemetry values 161 to be comparable to models 175 or baseline values 163 determined from other drivers driving on either the same or comparable routes.

In variations, the route selector 154 determines a remainder of the evaluation route 157 as the driver initiates and begins to drive through a portion of the evaluation route. As the driver progresses through the evaluation route 157, the remainder of the evaluation route 157 can be determined based on factors such as the driver's performance (or perceived weaknesses), as detected from the driver's performance to the point in time.

Other examples contemplate that the baseline set of values 163 are determined using a model trainer component (not shown). The model trainer can generate and/or refine the baseline profiles which are stored with the model library 177. The baseline profiles can be modified based on either theoretical models (e.g., from some third party source) or data collected over time from the vehicle of a model driver. In some examples, the baseline values 163 can be based on theoretical or collected data that is specific to a vehicle type, a roadway condition or other factors. The baseline values 163 for model drivers can also be based on an expected behavior of the driver over time as the driver operates the vehicle in making one or more maneuvers.

In some examples, the driver evaluation sub-system 150 may also implement a task manager 160 that classifies the driver of the vehicle by type based on the determined characterization 169. The task manager 160 may update 171 the driver's profile 95 with the determined characterizations 169. In variations, the task manager can select one or more remedial or required actions 181 based on the characterizations 169 determined by the evaluation component.

Methodology

Figure 2:
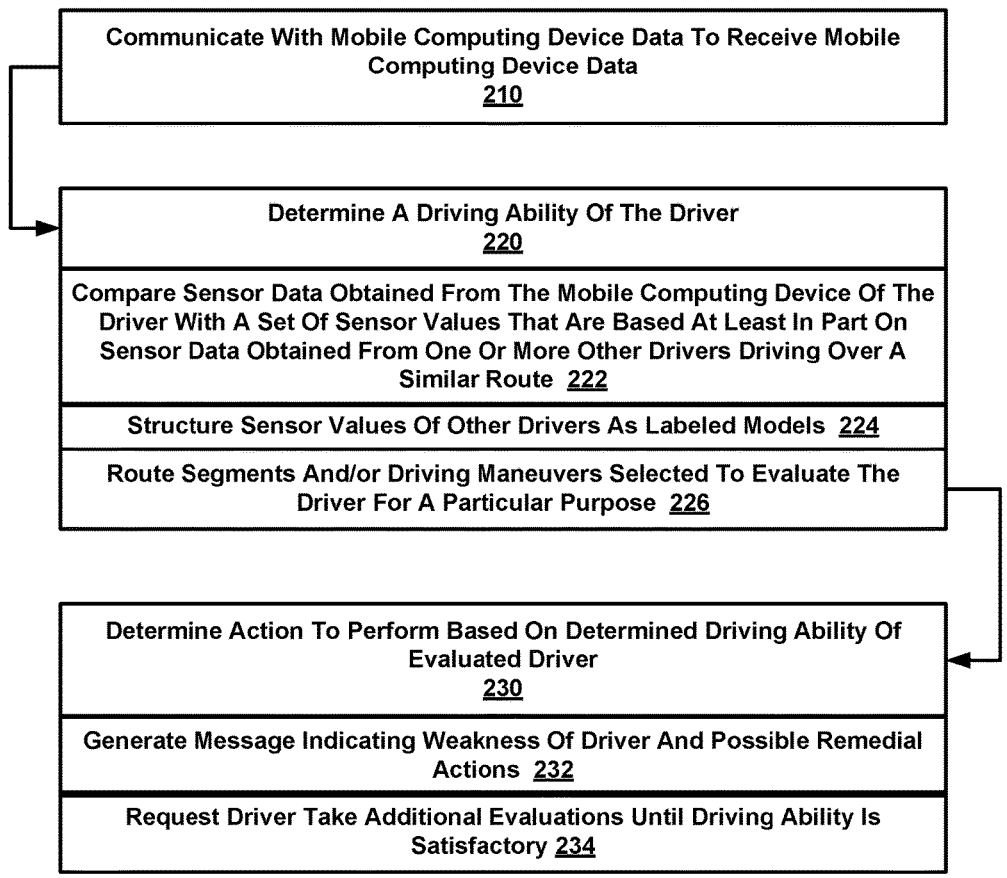
FIG. 2 illustrates an example method, in an accordance with some embodiments, for characterizing driver ability using data generated from mobile device sensors.

FIG. 2 illustrates an example method, in an accordance with some embodiments, for characterizing driver ability using data generated from mobile device sensors. The method such as described by an example of FIG. 2 can be implemented using, for example, components described with an example of FIG. 1B. Accordingly, references made to elements of FIG. 1B are for the purposes of illustrating a suitable element or component for performing a step or sub-step being described.

With reference to an example of FIG. 2, the network computing system 100 can communicate with a mobile computing device that is carried within a vehicle to receive mobile computing device data (210). The mobile computing device data can include sensor data of one or more types that reflect an attribute of the driver's operation of a vehicle. The sensor data can include local device data 109 from one or more sensors components of the mobile computing device and position data provided by a GPS component of the mobile computing device. The attributes can be determined from, for example, sounds, movement, or other operational or environmental attributes associated with operation of the vehicle. The sensor data can be received via multiple types of sensors (e.g., IMU, accelerometer, gyroscope, barometer, microphone, etc.) on either one or both of the driver device 102 or requester device 104, and can detect one or more environmental conditions indicative of the context in which the vehicle operates.

The network computing system 100 can determine a driver ability of a driver using the mobile computing device data (220). In some examples, the driving ability of the driver is determined by comparing the sensor data obtained from the mobile computing device, with a set of sensor values that are based at least in part on sensor data obtained from other drivers who previously drove over the same or similar route (222).

In some examples, the set of sensor values from other drivers can be structured as a model that can be associated with a particular driving characterization, such as qualified driver or unqualified driver (224). The models can form a basis of comparison for the sensor data from the driver being evaluated. The comparison to the models can be based on, for example, mathematical distance, with the closest model providing a best match and corresponding label for the driver being evaluated. The sensor values for the individual models can be labeled manually, and/or based on parameters such as driving records of other drivers, and ratings or feedback from requesters who received transport from such drivers. Additionally, in some examples, models can be normalized for roadway variations, weather, and other contextual information (e.g., time of day).

In some examples, the route segments and/or maneuvers which the driver may be directed to perform (e.g., stopping, turning, lane changes, traffic signals, stop signs, intersections, T-intersections, etc.) can be selected to evaluate an overall ability of the driver, or to evaluate the driver for a particular purpose (e.g., driver a vehicle so passengers or comfortable) (226). The sensor data and/or position data can be used in part to determine contextual information (e.g., traffic conditions, weather, and/or elevation changes) that can refine and/or normalize the 109. Any combination of a portion or all of the sensor data and position data may be used to monitor and detect driver characteristics.

In some examples, the network computing system 100 can determine an action to perform based on a determined driving ability of an evaluated driver (230). By way of example, the network computing system 100 may generate, for the driver, a message or series of messages which inform the driver of weaknesses in the driver's ability, and steps which the driver can take to improve upon the driver's ability (232). In other examples, the network computing system 100 may request for the driver to take additional evaluations until their driving ability is deemed acceptable (234).

Hardware Diagram

Figure 3:
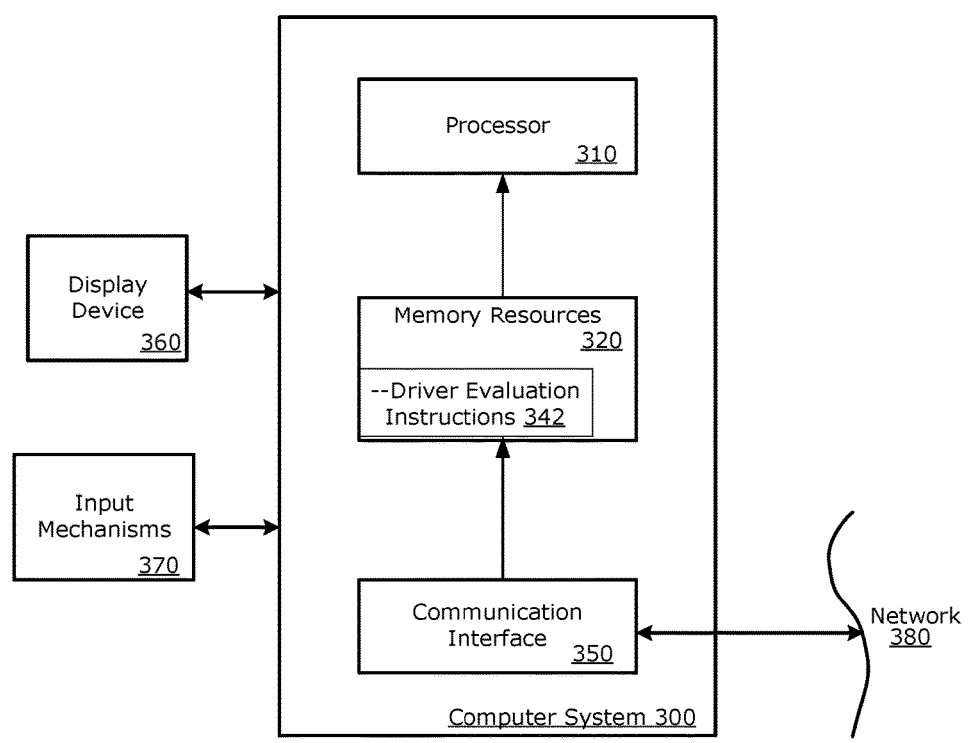
FIG. 3 illustrates a block diagram, in accordance with some embodiments that illustrates a computer system upon which embodiments described may be implemented.

FIG. 3 illustrates a block diagram, in accordance with some embodiments that illustrates a computer system 300 upon which embodiments described may be implemented. For example, in the context of FIG. 1B, the network computing system 100 that determines driver characteristics may be implemented using a computer system such as described by FIG. 3. The network computing system 100 may also be implemented using a combination of multiple computer systems as described by FIG. 3.

In some implementations, a computer system 300 includes processing resources (e.g., processor 310), memory resources 320 and a communication interface 350. The computer system 300 includes at least one processor 310 for processing information and memory resources 320, such as a main memory, a random access memory (RAM) or a dynamic storage device, for storing information and instructions to be executed by the processor 310. The main memory 320 may be used for storing temporary variables or other intermediate information during execution of instructions to be executed by the processor 310. The memory resources 320 may also include other forms of memory or other static storage device for storing static information and instructions for the processor 310. The memory resources 320 can store information and instructions, including instructions 342 ("driver evaluation instructions 342") for implementing a driver evaluation system, such as described with an example of FIG. 1B.

For example, the processor 310 can execute the instructions 342 to implement a driver evaluation sub-system 150 such as described with an example of FIG. 1B. Likewise, the processor 310 can execute the instructions 342 to implement a method such as described with an example of FIG. 2.

The communication interface 350 can enable the computer system 300 to communicate with one or more networks 380 (e.g., cellular network) through use of the network link (wireless or wireline). Using the network link, the computer system 300 can communicate with one or more other computing devices and/or one or more other servers or data centers.

The computer system 300 can also include a display device 360, such as a cathode ray tube (CRT), an LCD monitor, or a television set, for example, for displaying graphics and information to a user. One or more input mechanisms 370, such as a keyboard that includes alphanumeric keys and other keys, can be coupled to the computer system 300 for communicating information and command selections to the processor 310. Other non-limiting, illustrative examples of input mechanisms 370 include a mouse, a trackball, touch-sensitive screen, or cursor direction keys for communicating direction information and command selections to the processor 310 and for controlling cursor movement on the display 360.

Examples described herein are related to the use of the computer system 300 for implementing the techniques described herein. According to some embodiments, those techniques are performed by the computer system 300 in response to the processor 310 executing one or more sequences of one or more instructions contained in the memory resources 320. Such instructions may be read into the memory resources 320 from another machine-readable medium, such as a storage device. Execution of the sequences of instructions 342 contained in the memory resources 320 to cause the processor 310 to perform the process steps described.

Figure 4:
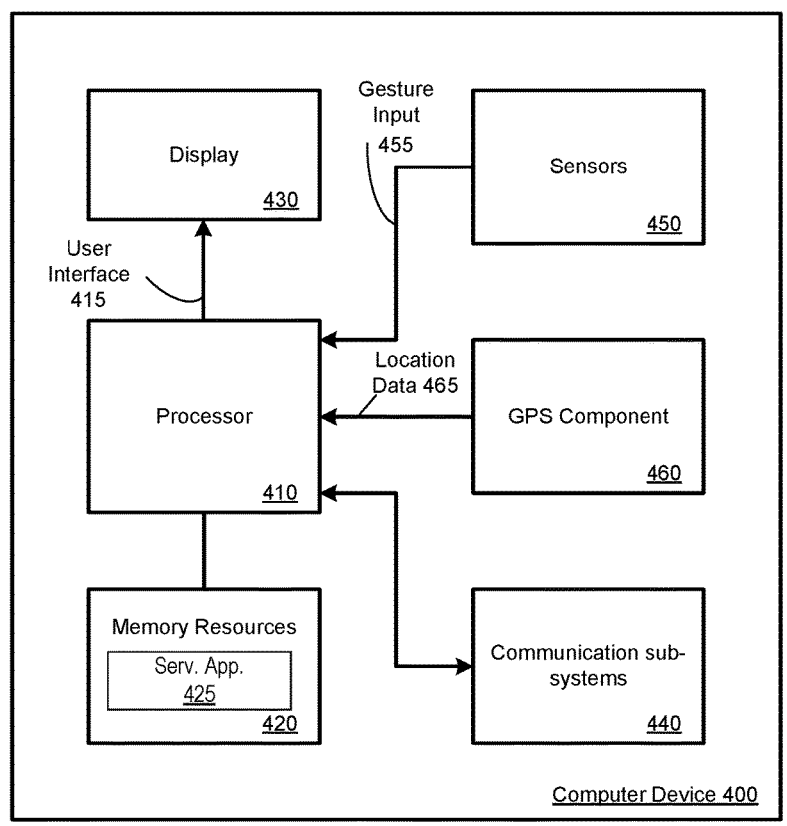
FIG. 4 is a block diagram that illustrates a computing device upon which embodiments described may be implemented.

FIG. 4 is a block diagram that illustrates a computing device upon which embodiments described herein may be implemented. In some embodiments, a computing device 400 may correspond to a mobile computing device, such as a cellular device that is capable of telephony, messaging, and data services. The computing device 400 can correspond to a device operated by a requester or, in some examples, a device operated by the service provider that provides location-based services. Examples of such devices include smartphones, handsets, tablet devices, or in-vehicle computing devices that communicate with cellular carriers. The computing device 400 includes a processor 410, memory resources 420, a display device 430 (e.g., such as a touch-sensitive display device), one or more communication sub-systems 440 (including wireless communication sub-systems), sensor components 450 (e.g., accelerometer, gyroscope, microphone, camera), and one or more location detection mechanisms (e.g., GPS component) 460. In some examples, at least one of the communication sub-systems 440 sends and receives cellular data over data channels and voice channels. The communications sub-systems 440 can include a cellular transceiver and one or more short-range wireless transceivers. The processor 410 can exchange data with a service arrangement system (not illustrated in FIG. 4) via the communications sub-systems 440.

The processor 410 can provide a variety of content to the display 430 by executing instructions stored in the memory resources 420. The memory resources 420 can store instructions for a service application 425, which can obtain sensor data 455 and location data 465, and transmit the data collectively, as local device data 409, to a remote node (e.g., network computing system 100) via the communication sub-system 440.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is being claimed is:

1. A computer-implemented method for evaluating a first driver, the method being performed by a network system and comprising:

receiving a plurality of sets of sensor data from a plurality of mobile computing devices of a plurality of drivers, each of the plurality of sets of the sensor data being generated by a respective one of the plurality of mobile computing devices while a respective one of the plurality of drivers operates a corresponding vehicle;

determining whether to perform a driver evaluation of the first driver based, at least in part, on a set of feedback data of a driver profile maintained for the first driver, the set of feedback data corresponding to feedback of the first driver received from one or more requesters of a network-based service for which the first driver is registered as a service provider;

in response to determining to perform the driver evaluation of the first driver:

transmitting, to a first mobile computing device of the first driver, route data corresponding to at least a portion of an evaluation route for the first driver to follow during the driver evaluation of the first driver;

causing the first mobile computing device of the first driver to transmit a first set of sensor data to the network system, the first set of sensor data being generated by the first mobile computing device while the first driver operates a first vehicle along the evaluation route; and determining a first metric for the first driver based on analyzing the first set of sensor data received from the first mobile computing device of the first driver and a computer-generated model based on a subset of the plurality of sets of sensor data received from the plurality of mobile computing devices.

2. The method of claim 1, further comprising:
determining route segments of the evaluation route based on one or more of: (i) a current location of the first driver as indicated by location data generated by the first mobile computing device, or (ii) the driver profile of the first driver.

3. The method of claim 1, wherein determining the first metric for the first driver includes identifying, based on analyzing the first set of sensor data and the computer-generated model based on the subset of the plurality of sets of sensor data, one or more unsafe driving actions that were performed by the first driver on the evaluation route.

4. The method of claim 1, further comprising determining the subset of the plurality of sets of sensor data based on respective metrics determined for the plurality of drivers.

5. The method of claim 1, further comprising determining the subset of the plurality of sets of sensor data based on respective ratings of the plurality of drivers in providing a transport service.

6. The method of claim 1, further comprising determining the subset of the plurality of sets of sensor data based on respective routes of the plurality of drivers.

7. The method of claim 1, wherein receiving the first set of sensor data from the first mobile computing device of the first driver includes receiving data from at least one of an accelerometer, gyroscope or inertial mass unit (IMU) of the first mobile computing device.

8. The method of claim 1, wherein determining the first metric includes evaluating a magnitude of a driving action performed by the first driver along the evaluation route.

9. The method of claim 8, wherein evaluating the magnitude of the driving action includes determining a severity of at least one of a braking action or turning action of the first driver when driving the first vehicle along the evaluation route.

10. The method of claim 1, further comprising:
instructing the first driver to mount the first mobile computing device to face a cabin of the first vehicle, in front of the first driver; and wherein receiving the first set of sensor data from the first mobile computing device includes receiving image data from the first mobile computing device, the image data capturing the first driver maneuvering one or more body segments while driving on the evaluation route.

11. The method of claim 1, further comprising:
determining a first route segment of the evaluation route based on a characteristic of the first route segment that is likely to cause a desired driving response from the first driver.

12. The method of claim 1, wherein determining whether to perform the driver evaluation of the first driver is based further on data of the driver profile maintained for the first driver indicating the first driver as a new service provider for the network-based service.

13. A non-transitory computer readable medium that stores instructions which, when executed by one or more processors of a network computer system, cause the network computer system to perform operations that include:

receiving a plurality of sets of sensor data from a plurality of mobile computing devices of a plurality of drivers, each of the plurality of sets of the sensor data being generated by a respective one of the plurality of mobile computing devices while a respective one of the plurality of drivers operates a vehicle;

determining whether to perform a driver evaluation of a first driver based, at least in part, on a set of feedback data of a driver profile maintained for the first driver, the set of feedback data corresponding to feedback of the first driver received from one or more requesters of a network-based service for which the first driver is registered as a service provider;

in response to determining to perform the driver evaluation of the first driver:
transmitting, to a first mobile computing device of the first driver, route data corresponding to at least a portion of an evaluation route for the first driver to follow during the driver evaluation of the first driver;

causing the first mobile computing device of the first driver to transmit a first set of sensor data to the network computer system, the first set of sensor data being generated by the first mobile computing device while the first driver operates a first vehicle along the evaluation route; and determining a first metric for the first driver based on analyzing the first set of sensor data received from the first mobile computing device of the first driver and a computer-generated model based on a subset of the plurality of sets of sensor data received from the plurality of mobile computing devices.

14. A computer system comprising:
a memory to store a set of instructions;
one or more processors to execute the instructions to:
receive a plurality of sets of sensor data from a plurality of mobile computing devices of a plurality of drivers, each of the plurality of sets of the sensor data being generated by a respective one of the plurality of mobile computing devices while a respective one of the plurality of drivers operates a corresponding vehicle;

determine whether to perform a driver evaluation of a first driver based, at least in part, on a set of feedback data of a driver profile maintained for the first driver, the set of feedback data corresponding to feedback of the first driver received from one or more requesters of a network-based service for which the first driver is registered as a service provider;

in response to determining to perform the driver evaluation of the first driver:
transmit, to a first mobile computing device of the first driver, route data corresponding to at least a portion of an evaluation route for the first driver to follow during the driver evaluation of the first driver;

cause the first mobile computing device of the first driver to transmit a first set of sensor data to the computer system, the first set of sensor data being generated by the first mobile computing device while the first driver operates a first vehicle along the evaluation route; and determine a first metric for the first driver based on analyzing the first set of sensor data received from the first mobile computing device of the first driver and a computer-generated model based on a subset of the plurality of sets of sensor data received from the plurality of mobile computing devices.

15. The computer system of claim 14, wherein the one or more processors execute the instructions to:
determine route segments of the evaluation route based on one or more of: (i) a current location of the first driver as indicated by location data generated by the first mobile computing device, or (ii) the driver profile of the first driver.

16. The computer system of claim 14, wherein the one or more processors execute the instructions to determine the first metric by identifying, based on analyzing the first set of sensor data and the computer-generated model based on the subset of the plurality of sets of sensor data, one or more unsafe driving actions that were performed by the first driver on the evaluation route.

17. The computer system of claim 14, wherein the one or more processors execute the instructions to determine the subset of the plurality of sets of sensor data based on respective metrics determined for the plurality of drivers.

18. The computer system of claim 14, wherein the one or more processors execute the instructions to determine the subset of the plurality of sets of sensor data based on respective ratings of the plurality of drivers in providing a transport service.

19. The computer system of claim 17, wherein the one or more processors execute the instructions to determine the subset of the plurality of sets of sensor data based on respective routes of the plurality of drivers.

20. The computer system of claim 14, wherein determining whether to perform the driver evaluation of the first driver is based further on data of the driver profile of the first driver indicating the first driver as a new service provider for the network-based service.

* * * * *